(12) United States Patent
Savic et al.

(10) Patent No.: US 10,447,534 B1
(45) Date of Patent: Oct. 15, 2019

(54) CONVERGED INFRASTRUCTURE

(71) Applicant: EMC IP Holding Company LLC, Hopkinton, MA (US)

(72) Inventors: Dragan Savic, Brookline, MA (US); John S. Harwood, Paxton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 131 days.

(21) Appl. No.: 14/673,980

(22) Filed: Mar. 31, 2015

(51) Int. Cl.
*H04L 12/24* (2006.01)
*H04L 29/08* (2006.01)
*H04L 12/26* (2006.01)

(52) U.S. Cl.
CPC .......... *H04L 41/082* (2013.01); *H04L 43/08* (2013.01); *H04L 67/1097* (2013.01)

(58) Field of Classification Search
CPC .... H04L 67/1097; H04L 43/08; H04L 41/082
See application file for complete search history.

(56) References Cited

U.S. PATENT DOCUMENTS

| 8,726,114 B1* | 5/2014 | Vahidsafa | G11C 29/1201 714/718 |
| 8,856,774 B1* | 10/2014 | Kulaga | G06F 8/65 717/168 |
| 2009/0182868 A1* | 7/2009 | McFate | G06F 9/5027 709/224 |
| 2013/0325433 A1* | 12/2013 | Albano | G06F 9/455 703/21 |
| 2014/0136884 A1* | 5/2014 | Werner | G06F 11/2094 714/6.11 |
| 2015/0172117 A1* | 6/2015 | Dolinsky | H04L 41/0893 709/221 |

\* cited by examiner

*Primary Examiner* — Michael C Lai
(74) *Attorney, Agent, or Firm* — Ryan, Mason & Lewis, LLP

(57) ABSTRACT

A system, computer program product, and computer-executable method of managing a converged infrastructure, the system, computer program product, and computer-executable method including receiving system configuration information and updating the converged infrastructure with the configuration information.

15 Claims, 11 Drawing Sheets

US 10,447,534 B1

CONVERGED INFRASTRUCTURE

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

RELATED APPLICATIONS

This application is related to U.S. patent application Ser. No. 14/673,983 entitled "ADAPTABLE DATA STORAGE CONTROLLER CARD" and filed on even date herewith, the teachings of which applications are hereby incorporated herein by reference in their entirety.

TECHNICAL FIELD

This invention relates to data storage.

BACKGROUND

Computer systems are constantly improving in terms of speed, reliability, and processing capability. As is known in the art, computer systems which process and store large amounts of data typically include one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A system, computer program product, and computer-executable method of managing a converged infrastructure, the system, computer program product, and computer-executable method including receiving system configuration information and updating the converged infrastructure with the configuration information.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

Figure 1:
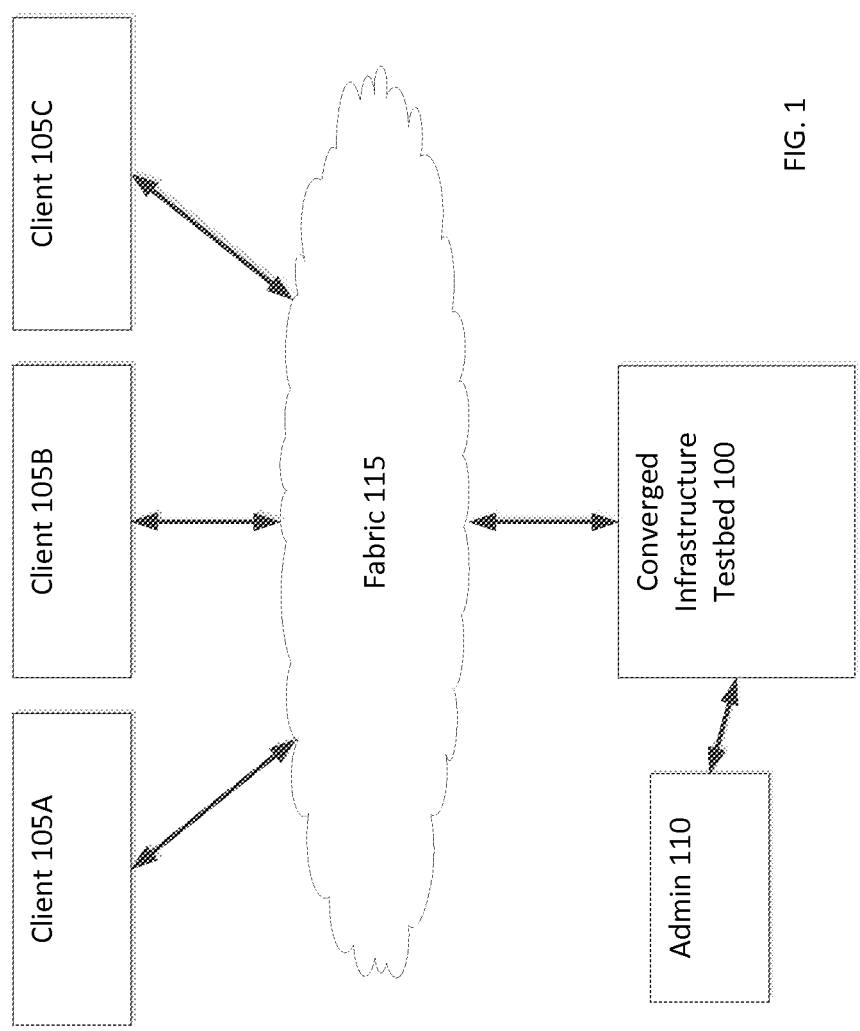
FIG. 1 is a simplified illustration of multiple clients utilizing a converged infrastructure testbed, in accordance with an embodiment of the present disclosure.

Typically, companies provide unified data storage solutions for their customers. Generally, the unified data storage solutions integrate a few technologies together to provide a customer with an efficient data storage solution that is enabled to address each of the customer's data storage needs. Traditionally, the data storage industry is in a state of flux where many new technologies are emerging and companies are only starting to learn how to integrate these emerging technologies. Conventionally, improving the ability to efficiently address the emergence of converged infrastructure and rapid innovation in data storage systems would be beneficial to the data storage system industry.

In many embodiments, the current disclosure may enable the modelling, use, and/or testing of one or more emerging data storage technologies that may be combined into a converged infrastructure. In certain embodiments, modeling may include use of a single reconfigurable hardware element to emulate functionality of many different converged infrastructure nodes. In other embodiments, the current disclosure may enable analysis of one or more different aspects of post-processing collected data from system emulation, such as, but not limited to, bandwidth, latency, processing power, efficiency, and/or other collected data. In various embodiments, converged infrastructure may operate by grouping multiple information technology (IT) components into a single, optimized computing package. In certain embodiments, components of a converged infrastructure may include data storage servers, data storage devices, networking equipment, and/or management modules which may be enabled to manage IT Infrastructure, automation, and/or orchestration of the converged infrastructure.

Converged Infrastructure Test Bed

Traditionally, with the emergence of Converged infrastructure and rapid innovation in compute, memory, and storage technology there is a great need to quickly model and/or test the interactions of various technologies and understand the interplay and ideal combinations for solutions. Generally, no platform exists for development of applications leveraging emerging technologies across domains. Conventionally, the landscape for persistent storage is evolving quickly and the ability to model and adapt to these new technologies is accomplished by connecting disparate solutions not intended to connect in any fashion. Typically, emulating heterogeneous tiers of memory and storage including emerging memories is becoming increasingly difficult. Traditionally, each vendor approaches the memory technology uniquely and the heterogeneous nature of diverse technologies provides a big obstacle for their quick evaluation.

In many embodiments, the current disclosure may enable creation of an extensible platform that may enable various types of emerging data storage technologies to be combined into a single platform. In various embodiments, the combination of multiple types of memory, data storage, and/or compute resources combined into a single platform may allow for research activities based on these emerging technologies, heterogeneous tiering, near data processing, and hardware based accelerations. In certain embodiments, the current disclosure may enable testing of a converged infrastructure within one or more fabrics and/or network infrastructures (i.e., LAN, SAN, Internet). In many embodiments a fabric may be any means of connecting heterogeneous nodes in such a way to allow each of the nodes to communicate with any other node.

In most embodiments, the current disclosure may enable an administrator to easily switch between one or more configurations of a converged infrastructure to model, analyze, and/or test one or more portions of the converged infrastructure. In various embodiments, a converged infrastructure testbed may include one or more multi-core controllers. In some embodiments, each multi-core controller may contain a plurality of processors which may be given various tasks based on the configuration of the converged infrastructure testbed. In certain embodiments, processors on a multi-core controller may be tasked with near data processing and/or may be used for hardware acceleration.

In many embodiments, a converged infrastructure testbed may include one or more data storage controller cards which may be enabled to utilize one or more types of current and/or emergent memory, such as, but not limited to, flash, Non-volatile Memory, DRAM, NAND, MRAM, RRAM, and/or other memory technology. In various embodiments, a data storage controller card may be enabled to be programmed to accept one or more types of memory. In certain embodiments, a data storage controller card may include one or more processors and memory which may enable the data storage controller card to execute data processing on the data controller card. In some embodiments, one or more data storage controller cards may be utilized as a fast cache before moving data to a secondary tier of data storage. In most embodiments, a converged infrastructure testbed may be in communication with one or more external data storage systems to use in combination with the converged infrastructure testbed's internal resources.

In various embodiments, a converged infrastructure testbed may include an Application Programming Interface (API), System Management Module, a Data Management module, an analysis module. In certain embodiments, a system management module may enable an admin and/or a user to configure the converged infrastructure testbed. In some embodiments, a system management module may enable homogeneous tiering of data storage, heterogeneous tiering of data storage, near data processing, and hardware based data I/O acceleration. In other embodiments, a data management module may be enabled to manage data I/Os utilizing internal resources and external data storage. In most embodiments, a data management module may be enabled to move data from one tier of data storage to a second tier of data storage. In various embodiments, a tier of data storage may include storage from internal resources and/or external data storage.

In many embodiments, the converged infrastructure testbed may include an analysis module which may be enabled to monitor and/or analyze usage of the storage technology used within the converged infrastructure testbed. In various embodiments, an analysis module may monitor and/or record data and/or data I/Os related to a resource within and/or connected to the converged infrastructure testbed. In various embodiments, recorded data and/or data I/Os may be used to analyze one or more configurations of data storage using the converged infrastructure testbed.

In most embodiments, one or more computing fabrics may connect the converged infrastructure testbed to one or more clients and/or one or more data storage systems. In various embodiments, a fabric may include a consolidated high-performance computing system comprising loosely coupled storage, networking, and/or parallel processing functions linked by high bandwidth interconnects (i.e. Gigabit Ethernet and Infiniband). In certain embodiments, a fabric may be private and limiting access to authorized users. In other embodiments, a fabric may include access to the internet.

In many embodiments, a converged infrastructure testbed may be enabled to utilize ARM, x86 processors, and/or any specific application accelerator. In various embodiments, a converged infrastructure testbed may be enabled to communicate and/or leverage multiple fabrics. In certain embodiments, a converged infrastructure testbed may enable analysis and/or testing of hardware components on a rack scale, in controlled forms which may enable understanding of component level interactions. In other embodiments, a converged infrastructure testbed may be enabled to emulate and/or model infrastructure containing, but not limited to, compute, network, and data storage. In various embodiments, a converged infrastructure testbed may enable users to access an extensible platform which may allow for utilization of future technologies in an industry standard format. In certain embodiments, a converged infrastructure testbed may facilitate development of one or more components within a data stack. In some embodiments, a converged infrastructure testbed may enable connecting heterogeneous components in a standard fashion.

Refer to the example embodiment of FIG. 1. FIG. 1 is a simplified illustration of multiple clients utilizing a converged infrastructure testbed, in accordance with an embodiment of the present disclosure. In this embodiment, Fabric 115 connects client 105A, client 105B, and client 105C to converged infrastructure testbed 100. Admin 110 is enabled to configure converged infrastructure testbed 100 to utilize various memory technology such as, but not limited to, Flash, Non-Volatile Memory, DRAM, NAND, MRAM, RRAM, and/or other fast data storage memory. Admin 110 is enabled to monitor the usage of converged infrastructure testbed 100 by client 105A, client 105B, and client 105C to analyze usage and/or determine efficiencies of one or more configurations of converged infrastructure testbed 100.

Figure 2:
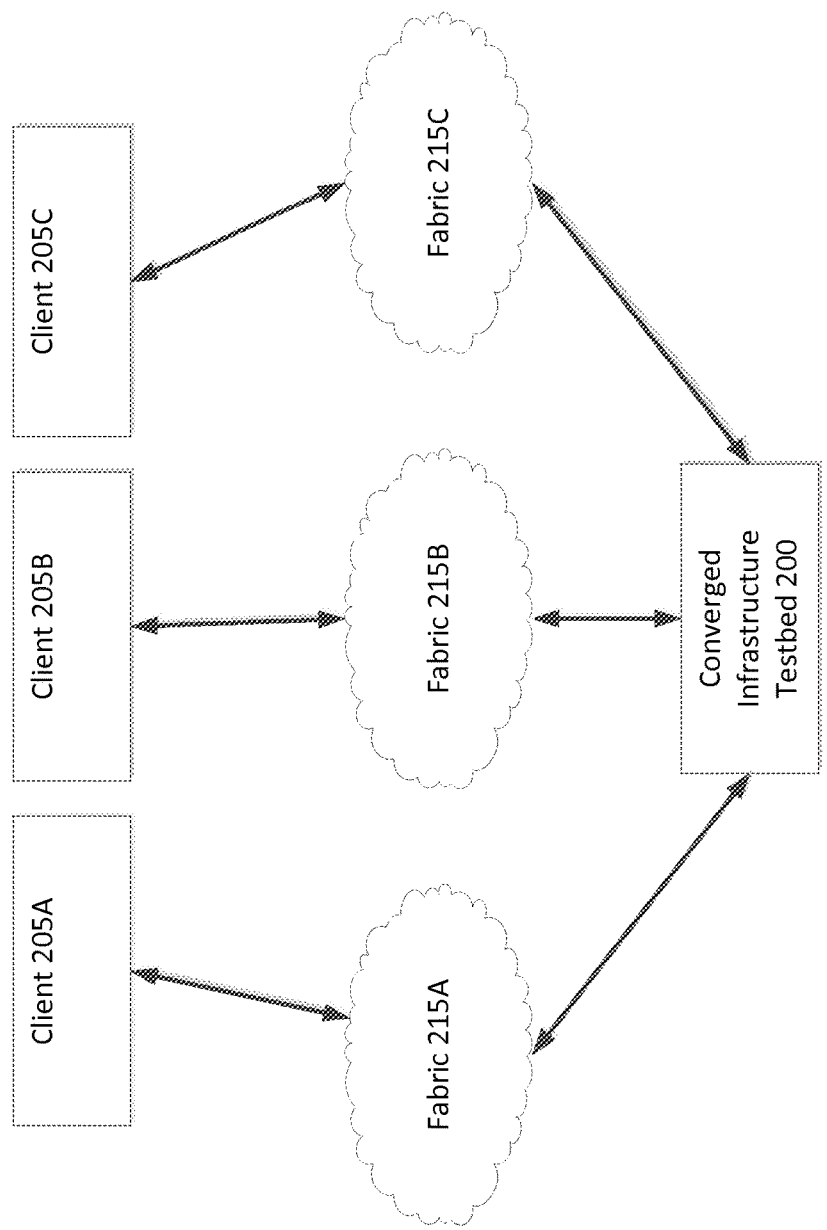
FIG. 2 is a simplified illustration of multiple clients accessing a converged infrastructure testbed through separate fabrics, in accordance with an embodiment of the present disclosure.

Refer to the example embodiment of FIG. 2. FIG. 2 is a simplified illustration of multiple clients accessing a converged infrastructure testbed through separate fabrics, in accordance with an embodiment of the present disclosure. In this embodiment, Converged Infrastructure testbed 200 is providing access to a test configuration of memory technology and is enabled to analyze how each client 205A, client 205B, and client 205C is enabled to use the test configuration of converged infrastructure testbed 200. As shown, client 205A communicates with converged infrastructure testbed 200 through fabric 215A. Client 205B communicates with converged infrastructure testbed 200 using fabric 215B. Client 205C communicates with converged infrastructure testbed 200 using fabric 215C. In this embodiment, each client's use of converged infrastructure testbed 200 does not overlap, meaning that each client is not enabled to access data I/Os from other clients communicating with converged infrastructure 200.

In some embodiments, clients connected to a converged infrastructure through separate fabrics may be enabled to access data from other clients in communication with the converged infrastructure. In certain embodiments, an admin and/or user may be enabled to configure which clients have access to one or more hardware resources managed by the converged infrastructure testbed.

Figure 3:
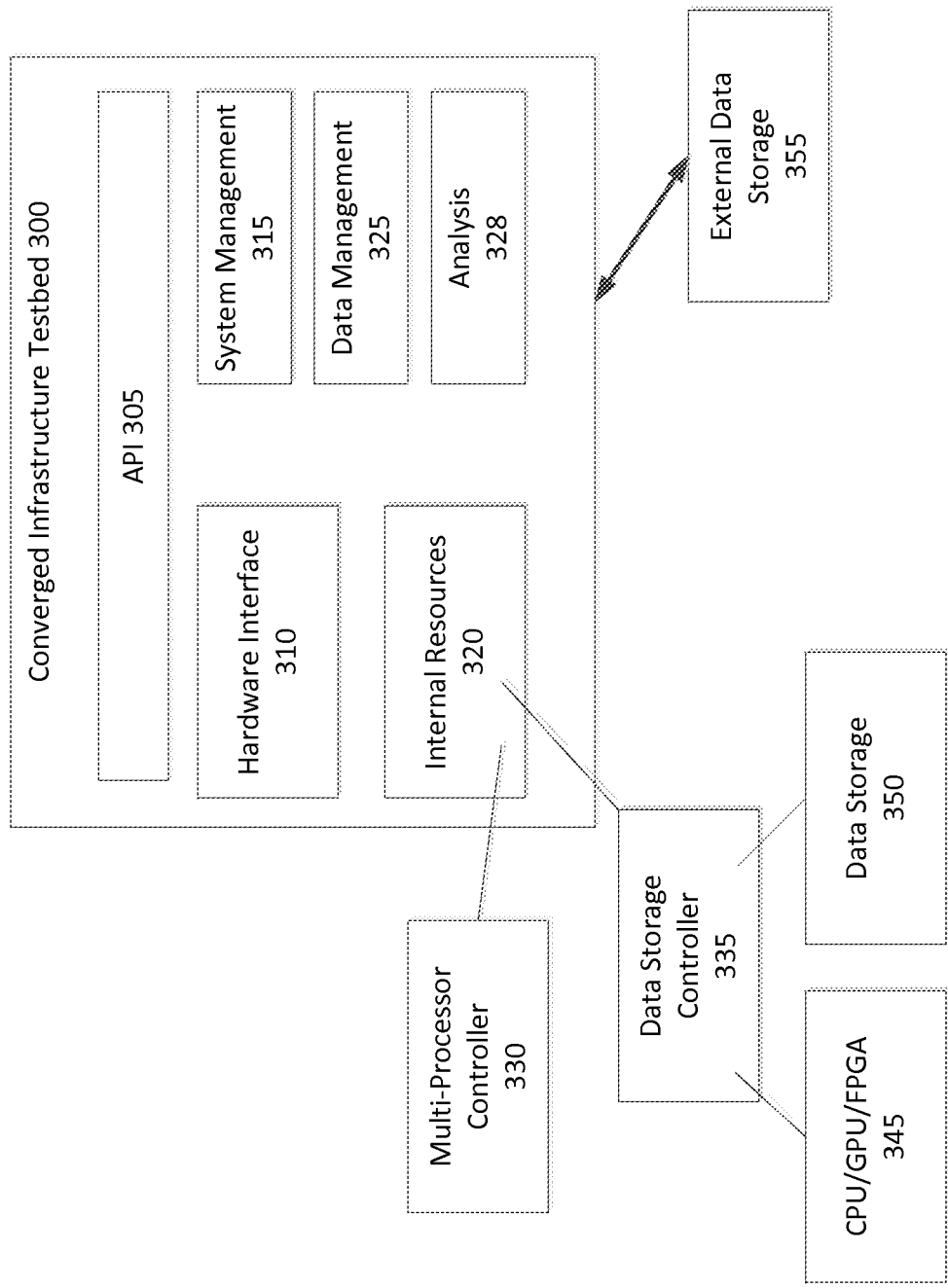
FIG. 3 is a simplified illustration of a converged infrastructure testbed, in accordance with an embodiment of the present disclosure.

Refer to the example embodiment of FIG. 3. FIG. 3 is a simplified illustration of a converged infrastructure testbed, in accordance with an embodiment of the present disclosure. As shown, converged infrastructure testbed 300 includes API 305, hardware interface 310, internal resources 320, system management module 315, data management module 325, and analysis module 328. API 305 enables converged infrastructure testbed 300 to send and receive data I/Os from clients utilizing converged infrastructure testbed 300. API 305 forwards data I/Os to data management module 325 which utilizes internal resources 320 and external data storage 355 to manage received data I/Os. Data management module 325 is enabled to communicate with internal resources 320 and external data storage 355 utilizing hardware interface 310. In many embodiments, an API for a converged infrastructure testbed API may include a REST interface. In various embodiments, a converged infrastructure testbed may include a data path connection over one or more fabrics. In other embodiments, a converged infrastructure testbed may be enabled to execute iSCSI offload, FCoE, and/or RDMA over Converged Ethernet.

System management module 315 is enabled to configure internal resources 320 and external data storage 355 based on received configuration information. For example, in various embodiments, the system management module may be enabled to configure data storage within the internal resources to act as fast storage or fast cache. In certain embodiments, the system management module may be enabled to configure data storage within the internal resources to be dedicated to one or more specified clients in communication with the converged infrastructure testbed.

Internal resources 320 include multi-core controller 330 and data storage controller 335. Multi-core controller 330 is enabled to manage multiple processors on multi-core controller 330 within converged infrastructure testbed 300. In various embodiments, a converged infrastructure testbed may be enabled to include multiple multi-core controllers. In some embodiments, a multi-core controller may be used for near data processing and/or processing of received data I/Os. System management module 315 is enabled to configure multi-core controller 330 to use one or more portions of the processors on multi-core controller 330 to execute tasks from clients using converged infrastructure testbed 300. Data storage controller 335 is enabled to utilize data storage 350 and CPU/GPU/FPGA 345. In many embodiments, a data storage controller may be enabled to manage one or more types of data storage technology in various combinations. In various embodiments, a converged infrastructure testbed may include multiple data storage controllers which may include one or more different types of data storage technology. In certain embodiments, CPU/GPU/FPGAs on a data storage controller may be configured and/or programmed to manage one or more different types of data storage technology included on the data storage controller.

Figure 4:
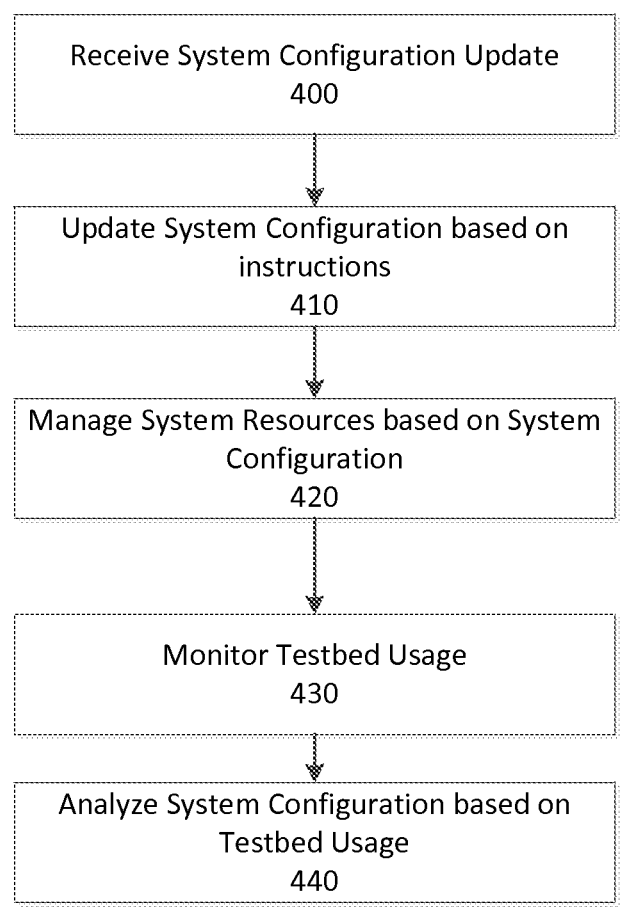
FIG. 4 is a simplified flowchart of a method of managing the converged infrastructure testbed shown in FIG. 3, in accordance with an embodiment of the present disclosure.

Refer to the example embodiments of FIGS. 3 and 4. FIG. 4 is a simplified flowchart of a method of managing the converged infrastructure testbed shown in FIG. 3, in accordance with an embodiment of the present disclosure. As shown in FIG. 3, converged infrastructure testbed 300 includes API 305, hardware interface 310, internal resources 320, system management module 315, data management module 325, and analysis module 328. API 305 receives system configuration information (Step 400) and forwards the system configuration information to system management module 315. System management module updates converged infrastructure testbed 300 based on the received system configuration information (Step 410). In some embodiments, system configuration information may include an update to one or more data storage controllers related to the type of data storage being used by the data storage controller. In other embodiments, system configuration information may indicate how a data management module may use internal resources and external data storage.

In this embodiments, data management module 325 manages internal resources 320 and external data storage 355 based on the system configuration (Step 420). Analysis module 328 monitors and records usage of internal resources 320, external data storage 355, as well as data I/Os generally received by converged infrastructure testbed 300 (Step 430). Analysis module 328 analyzes the system configuration in relation to usage of converged infrastructure testbed 300 (Step 440). In many embodiments, an Analysis module may be enabled to compare two or more system configurations based on information recorded by the analysis module. In various embodiments, an analysis module may be enabled to conduct analysis of many software and/or hardware performance characteristics of converged infrastructure.

Figure 5:
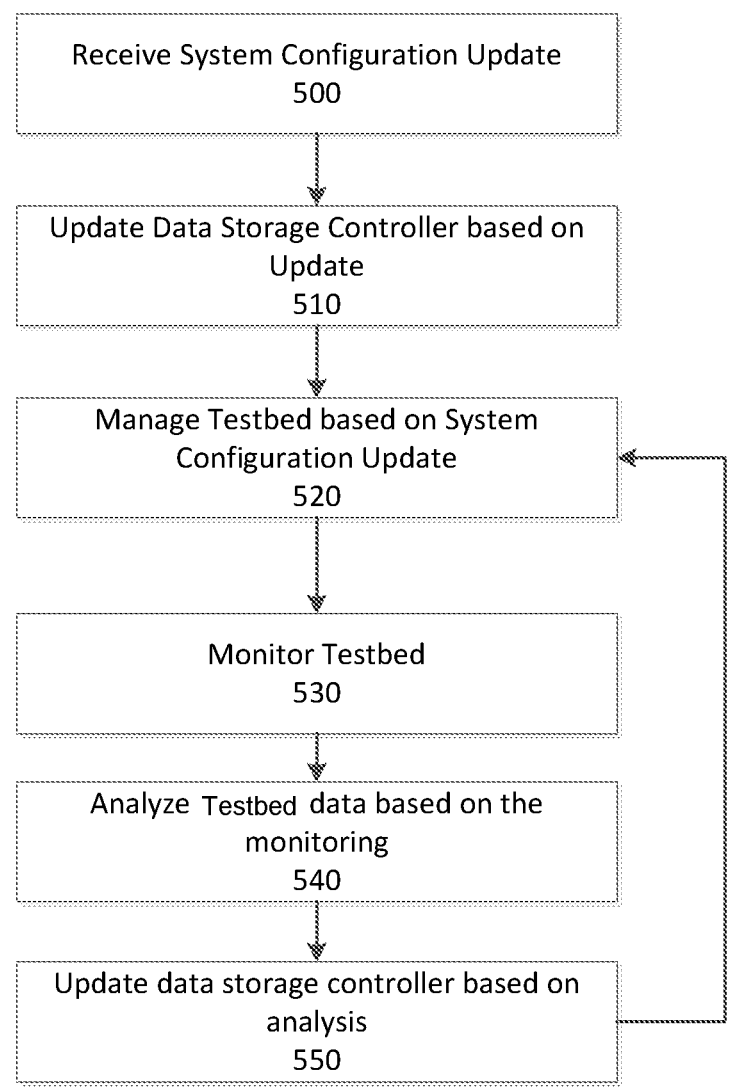
FIG. 5 is an alternate simplified flowchart of a method of managing the converged infrastructure testbed shown in FIG. 3, in accordance with an embodiment of the present disclosure.

Refer to the example embodiments of FIGS. 3 and 5. FIG. 5 is an alternate simplified flowchart of a method of managing the converged infrastructure testbed shown in FIG. 3, in accordance with an embodiment of the present disclosure. As shown in FIG. 3, converged infrastructure testbed 300 includes API 305, hardware interface 310, internal resources 320, system management module 315, data management module 325, and analysis module 328. API 305 receives a system configuration update (Step 500) related to data controller 335. System management module 315 updates data storage controller 335 based on the received system configuration update (Step 510). Data management module 325 manages converged infrastructure testbed 300 based on the system configuration update (Step 520). Analysis module 328 monitors usage of converged infrastructure testbed 300 (Step 530). Analyze usage of data storage controller 335 based on data recorded during monitoring of converged infrastructure testbed 300 (Step 540). Update data storage controller 335 based on the analysis (Step 550). Repeat steps 520, 530, 540, and 550 are repeated until desired results obtained.

In many embodiments, a converged infrastructure testbed may analyze and/or monitor packet statistics, communication protocol latency, IOPS, Processing latency, Read/write Latency. In other embodiments, a converged infrastructure testbed may be enabled to analyze and/or monitor Core utilization, cache hit/miss ratio, processing efficiency, bandwidth utilization, power consumption, and/or other aspects of data storage systems and fabrics that connect data storage systems. In most embodiments, using a converged infrastructure testbed to share underlying pieces of hardware may enable a determination of whether interference would result by mixing data flows through a CPU and onto data storage. In various embodiments, a converged infrastructure testbed may be utilized to determine power constraints while maintaining desired requirements. In certain embodiments, a user of a converged infrastructure testbed may be enabled to determine an amount of power necessary to maintain a level of usage of a specified configuration of hardware.

Adaptable Data Storage Controller Card

Traditionally, current platforms for data storage controllers are confined to one or two interfaces which directly correlate to specific data storage devices. Conventionally, when working with data storage devices, such as Solid State Drives (SSD), system-level innovations (and even optimizations) are locked by SSD vendors. Generally, current data storage controllers are not enabled to adapt to the emergence of converged infrastructure and rapid innovation in compute, memory, and storage technology. Conventionally, each vendor of data storage approaches memory technology uniquely and the heterogeneous nature of diverse technologies provide obstacles for evaluation and use. Typically, it would be beneficial to the data storage industry to have a platform that could adapt to future advancements in data storage.

In many embodiments, the current disclosure may enable use and/or communicate with SSDs using an open SSD design. In various embodiments, an Open SSD design may use standardized ARM 64 cores and/or other processors. In certain embodiments an Open SSD design may enable a Flash Translation Layer (FTL) to be accessible and dynamically manageable. In some embodiments, an open SSD design may enable tiering of heterogeneous memory. In other embodiments, an open SSD design may facilitate distributed compute & memory. In most embodiments, an open SSD design may enable a data storage controller to adapt for post-NAND data storage.

In many embodiments, the current disclosure may enable creation of a adaptable data storage controller which may be a flexible/programmable platform for Non-Volatile Memory (NVM) related uses. In various embodiments, an adaptable data storage controller may enable support for NVM media for performance and tiering optimization on a single platform, such as, but not limited to, TLC NAND, MRAM, PCM, RRAM, Hybrid memory, and/or other types of emerging memory technology. In some embodiments, an adaptable data storage controller may enable modular and/or dynamic NVM management architecture, such as, but not limited to, advanced FTL (system, local) and smart integration with DBMS. In other embodiments, the current disclosure may enable research into local compute and cross-layer optimization, such as, but not limited to, Storage Processor (SP) offloading and/or distributed processing. In most embodiments, an adaptable data storage controller card may enable work with various NVM and/or configurations of NVM without moving from one platform to another platform.

In many embodiments, an adaptable data storage controller may have a modular design to facilitate flexibility in using and/or testing various types of NVM. In some embodiments, an adaptable data storage controller may have a standard interface and form factor, such as a PCI-e and nx10 GigE. In various embodiments, an adaptable data storage controller (ADSC) may have an upgradable System on a chip (SoC) and Field Programmable Gate Array (FPGA) which may be used as programmable building blocks. In these embodiments, the ADSC may be enabled to use the SoC and FPGA to adapt to one or more types of NVM. In certain embodiments, an ADSC may include multiple types of sockets enabled to receive multiple types of modules, such as, but not limited to, Local DRAM, MRAM, NAND, and, post-NAND NVM modules.

In many embodiments, the current disclosure may enable an ADSC to be generic, configurable and capable of supporting newer technologies and their future interfaces. In various embodiments, a SoC and/or FPGA on an ADSC may be updated to adapt to newer technologies. In some embodiments, commands may be uploaded to a SoC and/or FPGA to modify one or more capabilities of an ADSC.

In many embodiments, the current disclosure may enable creation of an extensible platform that may enable multiple types of memory to be combined into a single platform. In various embodiments, the current disclosure may enable creation of an extensible platform that may be adaptable to activities based on emerging memories, heterogeneous tiering, near data processing, and hardware based accelerations.

In many embodiments, an ADSC may remove the research constraints of existing technology and may enable multiple types of memory to be combined into a single solution, providing configurable levels of interaction of technologies for modeling and evaluation. In various embodiments, an ADSC may be based on ARM (or other processor) SoC, FPGA, and multiple DIMMs (for NVM Modules) which may provide flexibility in areas of SSD. In certain embodiments, a Flash Translation Layer (FTL) Controller may be implemented on for example, but not limited to, generic ARM cores and/or other processors. In some embodiments, Non Volatile Memory (NVM) interfaces may be implemented on a programmable FPGA that may enable the ADSC to account for functional changes, voltage changes, and/or timing adjustments associated with emerging memory technologies. In most embodiments, NVM may be supported via multiple DIMM modules which may allow the ADSC to work with homogeneous and/or heterogeneous configurations of emerging memory technology.

Figure 6:
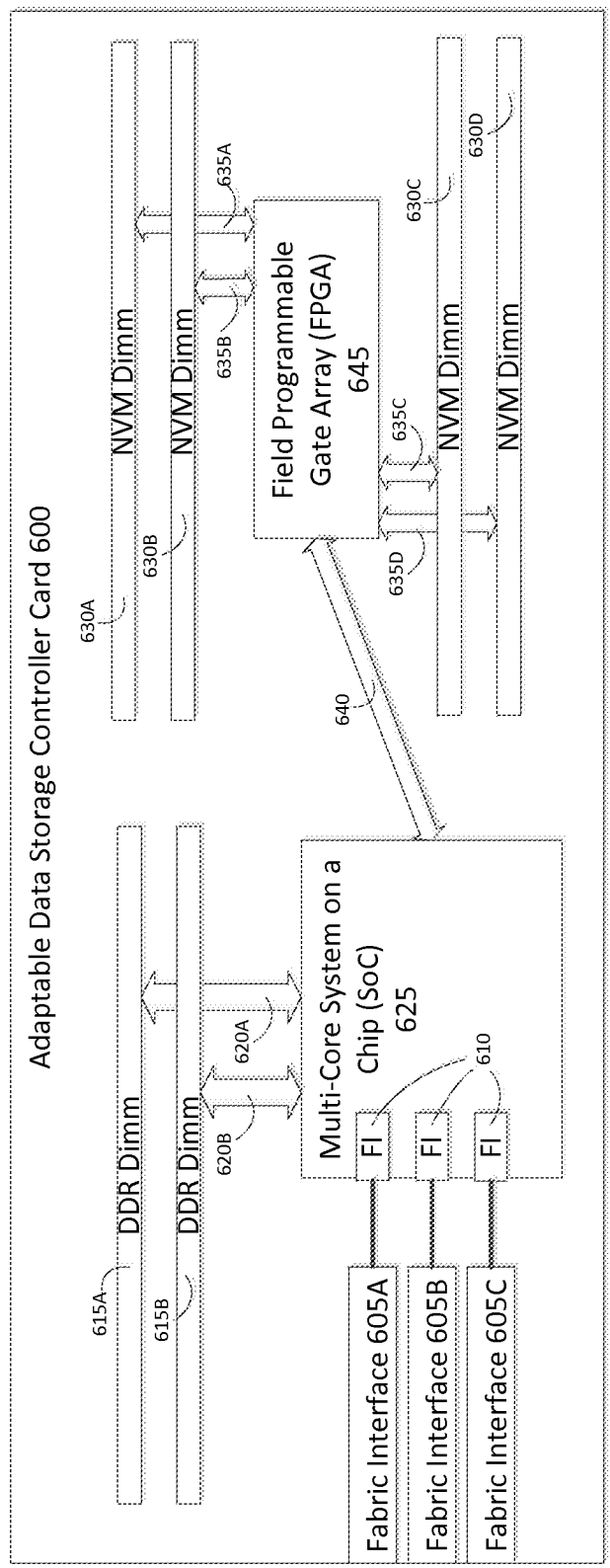
FIG. 6 is a simplified illustration of a block diagram of an Adaptable Data Storage Controller, in accordance with an embodiment of the present disclosure.

Refer to the example embodiment of FIG. 6. FIG. 6 is a simplified illustration of a block diagram of an Adaptable Data Storage Controller, in accordance with an embodiment of the present disclosure. In this embodiment, data storage controller (ADSC) card 600 includes DDR DIMM slots 615A, 615B, fabric interfaces 605A, 605B, 605C, multi-core System on a Chip (SoC) 625, Field Programmable Gate Array (FPGA) 645, and NVM DIMM slots 630A, 630B, 630C, 630D. SoC 625 is connected to fabric interface 605A, 605B, 605C through interface 610. SoC 625 is in communication with DDR DIMM 615A using interconnect 620A. SoC 625 is in communication with DDR DIMM 615B using interconnect 620B. SoC 625 is in communication with FPGA 645 using interconnect 640. In this embodiment, SoC 625 manages inputs from fabric interfaces 605A, 605B, 605C. In various embodiments, a SoC may receive data I/Os and other processing commands through the fabric interface. In certain embodiments, a SoC may be enabled to do some pre-processing of data I/Os. In other embodiments, a SoC may be enabled to execute near memory processing.

FPGA 645 communicates with NVM DIMM slot 630A using interconnect 635A. FPGA 645 communicates with NVM DIMM slot 630B using interconnect 635B. FPGA 645 communicates with NVM DIMM Slot 630C using interconnect 635C. FPGA 645 communicates with NVM DIMM slot 630 D using interconnect 635D. SoC 625 is enabled to manage FPGA 645 and direct data I/Os to NVM memory placed in NVM DIMM slots 630A, 630B, 630C, 630D using FPGA 645. In this embodiment, FPGA 645 is enabled to be modified to communicate with various NVM memory placed within NVM DIMM slots 630A, 630B, 630C, 630D.

In many embodiments, an ADSC card may be enabled to support one or more types of hardware communication protocols. In various embodiments, an ADSC card may be enabled to support DDR3 DRAM standard bus, NAND ONFI standard bus, PCIe, RapidIO, and/or other hardware communication protocols. In certain embodiments, an ADSC card may be enabled to be programmed with current and/or emergent communication protocols to communicate with various types of memory, data storage, compute, and/or other data storage technologies.

Figure 7:
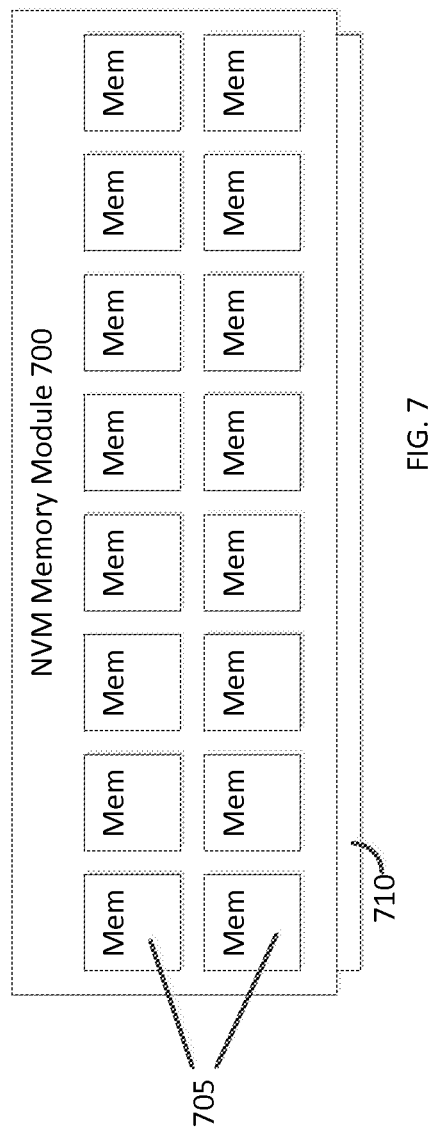
FIG. 7 is a simplified illustration of a NVM Dual in-line memory module (DIMM) Module enabled to be used with the ADSC card shown in FIG. 6, in accordance with an embodiment of the present disclosure.

In some embodiments, an ADSC card may be enabled to provide tiers of data storage using one or more memory cards managed by the FPGA. In other embodiments, an ADSC card may be enabled to provide pre-processing and/or near-memory processing using an SoC and/or an FPGA. In certain embodiments, an ADSC card may be enabled to be modified and/or programmed to communicate with various memory cards which may include, but is not limited to, flash storage, NVM storage, and/or other data storage technology. In certain embodiments, an ADSC card may be enabled to manage various types of memory cards at the same time. For example, in some embodiments, an ADSC card may manage 2 flash memory cards, and 2 NVM memory cards, where each card communicates using a different communication protocol. In most embodiments, the ADSC card may include a plurality of NVM DIMM slots and DDR DIMM slots. In various embodiments, an ADSC card may include more than four NVM DIMM slots Refer to the example embodiment of FIG. 7. FIG. 7 is a simplified illustration of a NVM DIMM Module enabled to be used with the ADSC card shown in FIG. 6, in accordance with an embodiment of the present disclosure. In this embodiments, NVM Memory module 700 includes sixteen (16) memory chip 705 and includes PCI-e connection 710.

Figure 8:
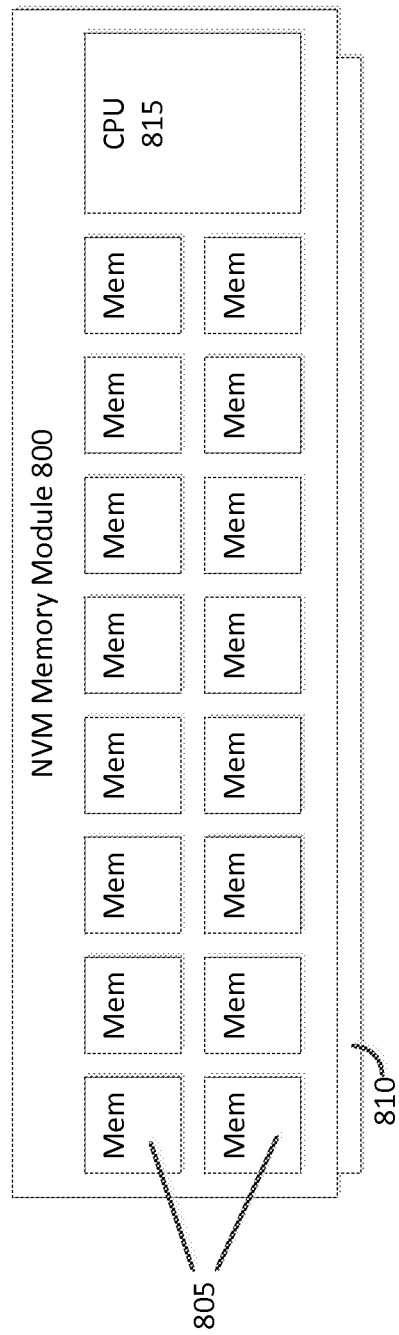
FIG. 8 is an alternate simplified illustration of a NVM DIMM Module enabled to be used with the ADSC card shown in FIG. 6, in accordance with an embodiment of the present disclosure.

Refer to the example embodiment of FIG. 8. FIG. 8 is an alternate simplified illustration of a NVM DIMM Module enabled to be used with the ADSC card shown in FIG. 6, in accordance with an embodiment of the present disclosure. In this embodiment, NVM Memory module 800 includes sixteen (16) memory chips 805 and includes PCI-e connection 810. NVM Memory module 800 includes CPU 815 which enables NVM Memory module 800 to execute limited data I/O processing within NVM Memory module 800.

In many embodiments, memory vendors may provide unique non-standard evaluation platforms that may be tailored around a specific solution, which may limit the ability to explore homogeneous and/or heterogeneous combinations and system tiering solutions.

In many embodiments, an ADSC card may be a flexible and/or programmable platform for NVM related uses supporting all layers of exploration. In various embodiments, with regards to Hardware, an ADSC card may enable exploration of NVM media for performance and tiering optimization on a single platform using TLC NAND, MRAM, PCM, RRAM, NRAM, and other emerging memory technology. In certain embodiments, with regards to firmware, an ADSC card may enable various configurations of NVM management architecture, advanced Flash Translation Layer (FTL), smart integration with DBMS, and/or integration with other emerging technologies. In most embodiments, with regards to software, an ADSC card may enable research on local compute, cross-layer optimization, storage processor offloading, distributed processing, and utilization of other data management techniques using emerging memory technology. In some embodiments, an ADSC card may enable a user to create multiple configurations of NVM (and/or emerging memory) without moving from one platform to another.

In most embodiments, the current disclosure may enable an application to be layered on the ADSC, running an operating system, where policy may be described and different memory technologies may be invoked to service application requests. In various embodiments, by leveraging local compute facilities, the application processing may be layered to model offload functionality in addition to various persistent memory technologies.

In many embodiments, an ADSC card may be used to test an application utilizing various memory technologies, understanding the impact of persistence and latency in service delivery. In various embodiments, an ADSC card may be used to create a system ecosystem which may be developed to model wear leveling and flash management across persistent memory technologies. In these embodiments, creation of a system ecosystem may enable for different policies to be demonstrated for tiering as well as endurance management on a device and system level. In some embodiments, an ADSC card may enable application disaggregation which may be modeled as a demonstration of offload capability. In other embodiments, with the localization processing and FPGA of an ADSC card, an application may be segmented to demonstrate compute and storage capability for an application leveraging persistent memory technology.

In many embodiments, an ADSC card may be enabled to utilize compression, encryption, and/or an NVMe driver. In other embodiments, an ADSC card may be enabled to execute iSCSI offload, FCoE, and/or RDMA over Converged Ethernet.

In many embodiments, the current disclosure may enable an ADSC to divide I/Os into groups. In various embodiments, each DIMM on an ADSC may have a dedicated group of I/O DIMMs. In certain embodiments, an ADSC card may be enabled to communicate with one or more NVM cards using various voltage levels. For example, in an embodiment, a first NVM card may require 1.5 Volts and a second NVM card may require 2.5 Volts. In most embodiments, an ADSC card may enable faster I/Os with one or more NVM cards on the ADSC card using a higher voltage and/or variable voltage to communicate with the one or more NVM cards.

Figure 9:
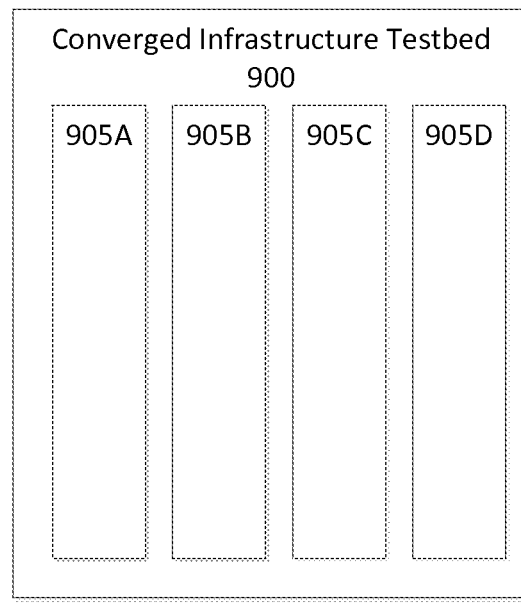
FIG. 9 is a simplified illustration of a converged infrastructure testbed utilizing multiple ADSC cards, in accordance with an embodiment of the present disclosure.

Refer to the example embodiment of FIG. 9. FIG. 9 is a simplified illustration of a converged infrastructure testbed utilizing multiple ADSC cards, in accordance with an embodiment of the present disclosure. In this embodiment, converged infrastructure testbed 900 includes within its internal hardware ADSC cards (905A-D, 905 generally). As shown, converged infrastructure testbed 900 is enabled to manage ADSC cards 905 individually, in unison, or in subsets. For example, in certain embodiments, a converged infrastructure testbed may be enabled to provide multiple tiers of data storage where an ADSC card may be a single tier of data storage. In various embodiments, a converged infrastructure testbed may be enabled to combine two or more ADSC cards to provide data storage and/or a tier of data storage. In some embodiments, a converged infrastructure testbed may be enabled to use a portion of one ADSC card to provide a tier of data storage. In most embodiments, each ADSC card utilized within the converged infrastructure testbed may utilize one or more different types of data storage technology. In some embodiments, an ADSC card may use multiple flash memory modules. In various embodiments, an ADSC card may use multiple NVM memory modules. In certain embodiments, an ADSC card may use a combination of flash memory modules, NVM memory modules, DRAM, NAND, MRAM, RRAM and/or other various memory modules in various configurations.

General

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 10:
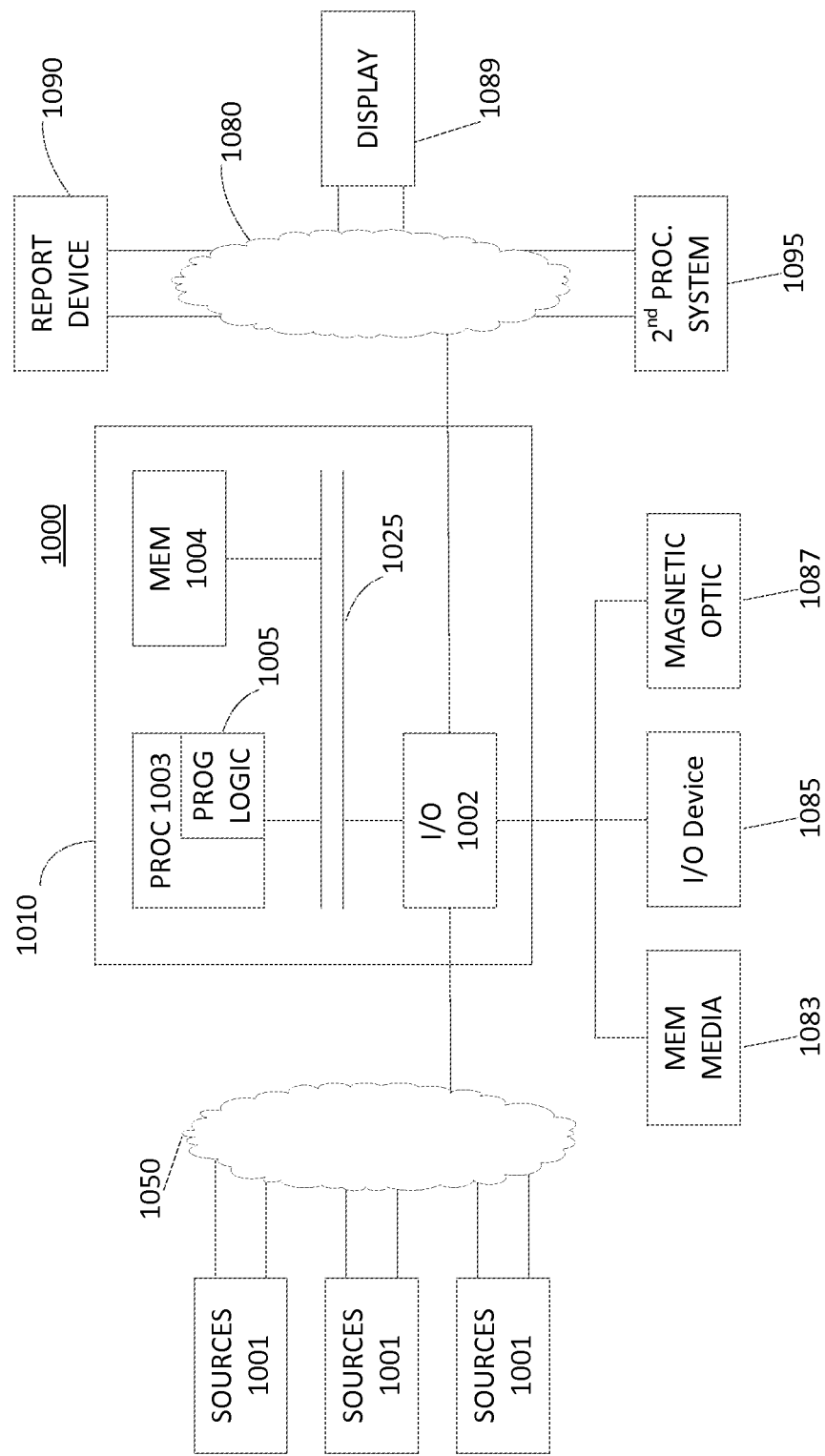
FIG. 10 is an example of an embodiment of an apparatus that may utilize the techniques described herein, in accordance with an embodiment of the present disclosure.

FIG. 10 is a block diagram illustrating an apparatus, such as a computer 1010 in a network 1000, which may utilize the techniques described herein according to an example embodiment of the present invention. The computer 1010 may include one or more I/O ports 1002, a processor 1003, and memory 1004, all of which may be connected by an interconnect 1025, such as a bus. Processor 1003 may include program logic 1005. The I/O port 1002 may provide connectivity to memory media 1083, I/O devices 1085, and drives 1087, such as magnetic or optical drives. The computer 1010 is configured to communicate with a plurality of sources 1001 via a network 1050 using the I/O port 1002. The computer 1010 is further configured to communicate with a display 1089, a report device 1090, and a second processing system 1095 via a network 1080 using the I/O port 1002. When the program code is loaded into memory 1004 and executed by the computer 1010, the machine becomes an apparatus for practicing the invention. When implemented on one or more general-purpose processors 1003, the program code combines with such a processor to provide a unique apparatus that operates analogously to specific logic circuits. As such, a general purpose digital machine can be transformed into a special purpose digital machine.

Figure 11:
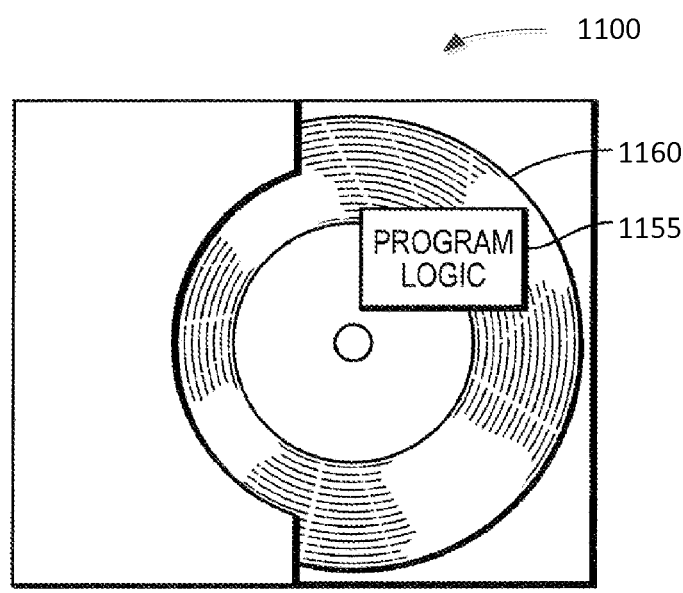
FIG. 11 is an example of a method embodied on a computer readable storage medium that may utilize the techniques described herein, in accordance with an embodiment of the present disclosure.

FIG. 11 is a block diagram illustrating a method embodied on a computer readable storage medium 1160 that may utilize the techniques described herein according to an example embodiment of the present invention. FIG. 11 shows Program Logic 1155 embodied on a computer-readable medium 1160 as shown, and wherein the Logic is encoded in computer-executable code configured for carrying out the methods of this invention and thereby forming a Computer Program Product 1100. Program Logic 1155 may be the same logic 1005 on memory 1004 loaded on processor 1003 in FIG. 10. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-11. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method of managing a converged infrastructure including a data storage system and one or more heterogeneous memory cards, the computer-executable method comprising:

receiving system configuration information identifying at least one particular configuration of a plurality of possible configurations of the one or more heterogeneous memory cards, the one or more heterogeneous memory cards comprising at least a first set of memory modules of a first type of memory technology and a second set of memory modules of a second type of memory technology different than the first type of memory technology;

updating the converged infrastructure with the system configuration information to implement the at least one particular configuration of the one or more heterogeneous memory cards, wherein the converged infrastructure comprises a converged infrastructure testbed that includes the one or more heterogeneous memory cards; and testing, by an analysis module, the one or more heterogeneous memory cards in the at least one particular configuration using the converged infrastructure testbed;

wherein different ones of the plurality of possible configurations of the one or more heterogeneous memory cards utilize different arrangements of the memory modules of the first and second sets of memory modules of the respective first and second different memory technology types; and wherein the system configuration information is provided to the converged infrastructure to enable configuration of multiple memory modules of the one or more heterogeneous memory cards within the converged infrastructure to enable analysis and/or comparison of various configurations of memory modules.

2. The computer-executable method of claim 1, wherein the system configuration information designates a configuration of memory modules within the one or more heterogeneous memory cards in the converged infrastructure, and wherein the converged infrastructure is enabled to manage data input/outputs (I/Os) to analyze the designated configuration of memory modules within the converged infrastructure.

3. The computer-executable method of claim 1, wherein the system configuration information designates a configuration of heterogeneous non-volatile memory (NVM) media modules within the converged infrastructure.

4. The computer-executable method of claim 3, wherein the converged infrastructure is enabled to monitor performance of the heterogeneous NVM media modules.

5. The computer-executable method of claim 3, wherein the analysis module analyzes one or more configurations of the heterogeneous NVM media modules, based on the system configuration information.

6. A system, comprising:
one or more computers in communication with a converged infrastructure comprising a converged infrastructure testbed including one or more heterogeneous memory cards; and
computer-executable program logic encoded in memory of the one or more computers to enable management of the converged infrastructure testbed, wherein the computer-executable program logic is configured for the execution of:
receiving system configuration information identifying at least one particular configuration of a plurality of possible configurations of the one or more heterogeneous memory cards, the one or more heterogeneous memory cards comprising at least a first set of memory modules of a first type of memory technology and a second set of memory modules of a second type of memory technology different than the first type of memory technology;
updating the converged infrastructure with the system configuration information to implement the at least one particular configuration of the one or more heterogeneous memory cards; and
testing, by an analysis module, the one or more heterogeneous memory cards in the at least one particular configuration using the converged infrastructure testbed;
wherein different ones of the plurality of possible configurations of the one or more heterogeneous memory cards utilize different arrangements of the memory modules of the first and second sets of memory modules of the respective first and second different memory technology types; and
wherein the system configuration information is provided to the converged infrastructure to enable configuration of multiple memory modules of the one or more heterogeneous memory cards within the converged infrastructure to enable analysis and/or comparison of various configurations of memory modules.

7. The system of claim 6, wherein the system configuration information designates a configuration of memory modules within the one or more heterogeneous memory cards in the converged infrastructure, and wherein the converged infrastructure is enabled to manage data input/outputs (I/Os) to analyze the designated configuration of memory modules within the converged infrastructure.

8. The system of claim 6, wherein the system configuration information designates a configuration of heterogeneous non-volatile memory (NVM) media modules within the converged infrastructure.

9. The system of claim 8, wherein the converged infrastructure is enabled to monitor performance of the heterogeneous NVM media modules.

10. The system of claim 8, wherein the analysis module analyzes one or more configurations of the heterogeneous NVM media modules, based on the system configuration information.

11. A computer program product for managing a converged infrastructure including a data storage system and one or more heterogeneous memory cards, the computer program product comprising:
a non-transitory computer readable medium encoded with computer-executable program code for management of the converged infrastructure, the code configured to enable the execution of:
receiving system configuration information identifying at least one particular configuration of a plurality of possible configurations of the one or more heterogeneous memory cards, the one or more heterogeneous memory cards comprising at least a first set of memory modules of a first type of memory technology and a second set of memory modules of a second type of memory technology different than the first type of memory technology;
updating the converged infrastructure with the system configuration information to implement the at least one particular configuration of the one or more heterogeneous memory cards, wherein the converged infrastructure comprises a converged infrastructure testbed that includes the one or more heterogeneous memory cards; and
testing, by an analysis module, the one or more heterogeneous memory cards in the at least one particular configuration using the converged infrastructure testbed;
wherein different ones of the plurality of possible configurations of the one or more heterogeneous memory cards utilize different arrangements of the memory modules of the first and second sets of memory modules of the respective first and second different memory technology types; and
wherein the system configuration information is provided to the converged infrastructure to enable configuration of multiple memory modules of the one or more heterogeneous memory cards within the converged infrastructure to enable analysis and/or comparison of various configurations of memory modules.

12. The computer program product of claim 11, wherein the system configuration information designates a configuration of memory modules within the one or more heterogeneous memory cards in the converged infrastructure, and wherein the converged infrastructure is enabled to manage data input/outputs (I/Os) to analyze the designated configuration of memory modules within the converged infrastructure.

13. The computer program product of claim 11, wherein the system configuration information designates a configuration of heterogeneous non-volatile memory (NVM) media modules within the converged infrastructure.

14. The computer program product of claim 13, wherein the converged infrastructure is enabled to monitor performance of the heterogeneous NVM media modules.

15. The computer program product of claim 13, wherein the analysis module analyzes one or more configurations of the heterogeneous NVM media modules, based on the system configuration information.

* * * * *